United States Patent

[11] 3,553,377

[72] Inventor William E. Jones
14207 Corvallis St., San Leandro, Calif. 94579

[21] Appl. No. 699,479
[22] Filed Jan. 22, 1968
[45] Patented Jan. 5, 1971

[54] EMERGENCY SELECTIVE MESSAGE SENDER FOR TELEPHONE

4 Claims, 4 Drawing Figs.

[52] U.S. Cl. .................................................... 179/5
[51] Int. Cl. .................................................... H04m 11/04
[50] Field of Search ........................................ 179/5, 5P, 90ADO

[56] References Cited

UNITED STATES PATENTS 2,768,239 10/1956 Foster .......................... 179/5(P)
3,207,849 9/1965 Andrews ...................... 179/5
3,287,500 11/1966 Moore .......................... 179/5(P)

*Primary Examiner*—Ralph D. Blakeslee
*Attorney*—William R. Piper

ABSTRACT: An emergency selective message sender that actuates a telephone dial automatically when an emergency arises and dials the telephone operator. The device is automatically actuated by heat or smoke and will send a selected message to the telephone operator about this. In case of a robbery, a switch can be closed by a person to manually actuate the device and another selected message will be sent to the telephone operator. The switch can be remote from the device and still cause the device to operate when the switch is actuated. The different messages are prerecorded on an endless tape and the proper selected message will be repeated so long as the device operates.

INVENTOR
WILLIAM E. JONES
BY William R. Piper
ATTORNEY

INVENTOR
WILLIAM E. JONES
BY William R. Piper
ATTORNEY

EMERGENCY SELECTIVE MESSAGE SENDER FOR TELEPHONE

CROSS-REFERENCE TO RELATED APPLICATION

In my copending patent application on an emergency message sender for telephone, Ser. No. 645,363, filed June 12, 1967, now abandoned, I disclose a device that will support the telephone handset in a position where the mouthpiece thereof can receive a tape-recorded message when a switch is closed. The closing of the switch releases the telephone dial that has previously been set to dial the telephone operator when so released. The tape recorder will be automatically started and will transmit an emergency message into the mouthpiece of the handset so that the telephone operator will hear this message and will act promptly to notify the proper authorities.

BACKGROUND OF THE INVENTION

1. Field of the Invention

In the case of a robbery or fire it becomes imperative that the proper authorities be notified as soon as possible. This can be accomplished by notifying the telephone operator who in turn can immediately relay the message to the police or fire department. In certain situations it may be impossible to gain access to the telephone and there also may be insufficient time for the person to give the required message over the telephone. An emergency message can be prerecorded on tape of a tape recorder and then the telephone dial can be preset to call the telephone operator when an electric switch is closed. The operator will hear the emergency message and can act promptly in notifying the proper authorities.

2. Description of the Prior Art

The patents to Foster et al., U.S. Pat. No. 2,768,239, issued Oct. 23, 1956; and Agule, U.S. Pat. No. 2,878,315, issued Mar. 17, 1959, both disclose alarm devices in which the telephone dial is held in a position that when it is automatically released by the closing of an electric switch, a message will be sent to a telephone operator. In the Foster et al. patent, the arm that holds the telephone dial in a predetermined position must raise the telephone handset before the dial can be released for automatically calling the operator.

The Agule patent discloses a pair of arms, one for holding the telephone switch hook plunger in off position until the arm is released, and the other arm for holding the telephone dial in a position where the dial will automatically connect with the telephone operator when this arm is actuated. The dial-holding arm must first be actuated before it will actuate the telephone switch hook plunger release arm. In a modified form of the patented device a cam will first actuate the arm that frees the switch hook plunger and then the same cam will release a catch member that frees a spring-biased arm which in turn releases the telephone dial so that it can connect the telephone with the telephone operator. A phonograph record is automatically started for delivering a prerecorded emergency message to the receiver of the telephone handset.

SUMMARY OF THE INVENTION

An object of my invention is to provide an emergency selective message sender for a telephone that will be automatically operated by the heat or smoke from a fire and will inform the telephone operator to call the fire department. The device is equipped with a switch that may be closed by a person when he wishes to apprehend a robber who has entered his home. The closing of the switch will cause the device to select another pretaped emergency message automatically and inform the telephone operator to call the police.

A safety feature of the device requires that for either emergency telephone call to the operator for the fire or police department, simultaneous impulses of two different frequencies are generated to activate the device and the device will not operate unless both impulses are of the proper frequency.

The device will not interfere with the ordinary use of the telephone for outgoing or incoming calls.

DESCRIPTION OF THE PREFERRED EMBODIMENT

Figure 1:
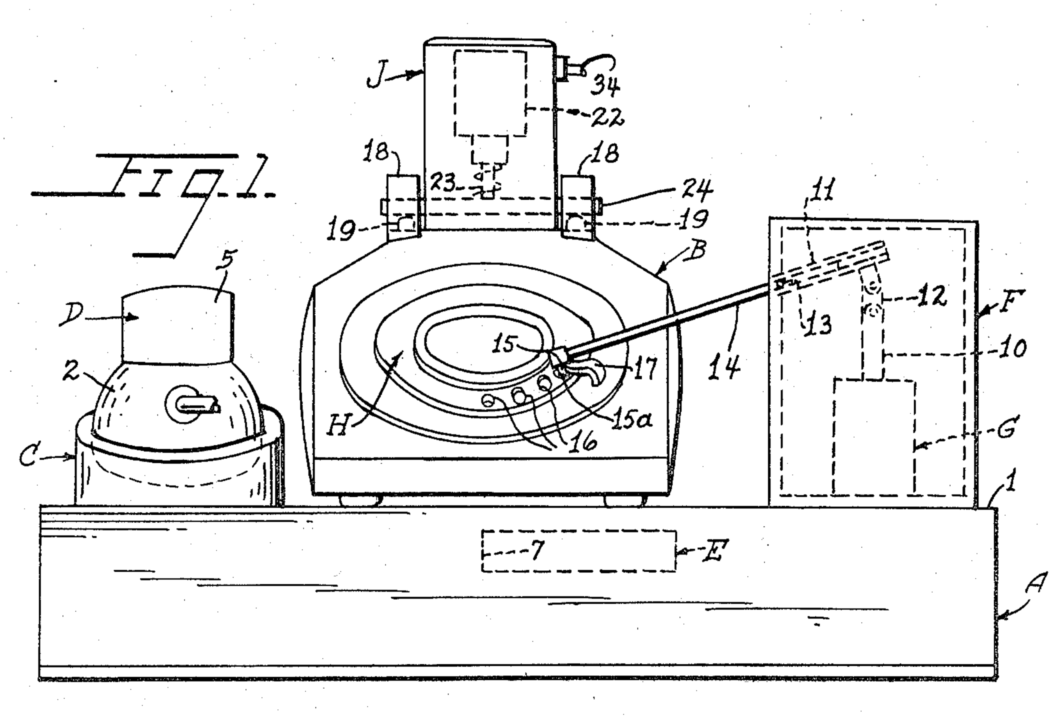
FIG. 1 is a front elevation of the device and illustrates the telephone handset and receiver placed in proper position on it preparatory to the automatic sending of a selected pretaped emergency to the telephone operator to call the fire or police department as soon as the device is activated by the closing of a switch.
Figure 2:
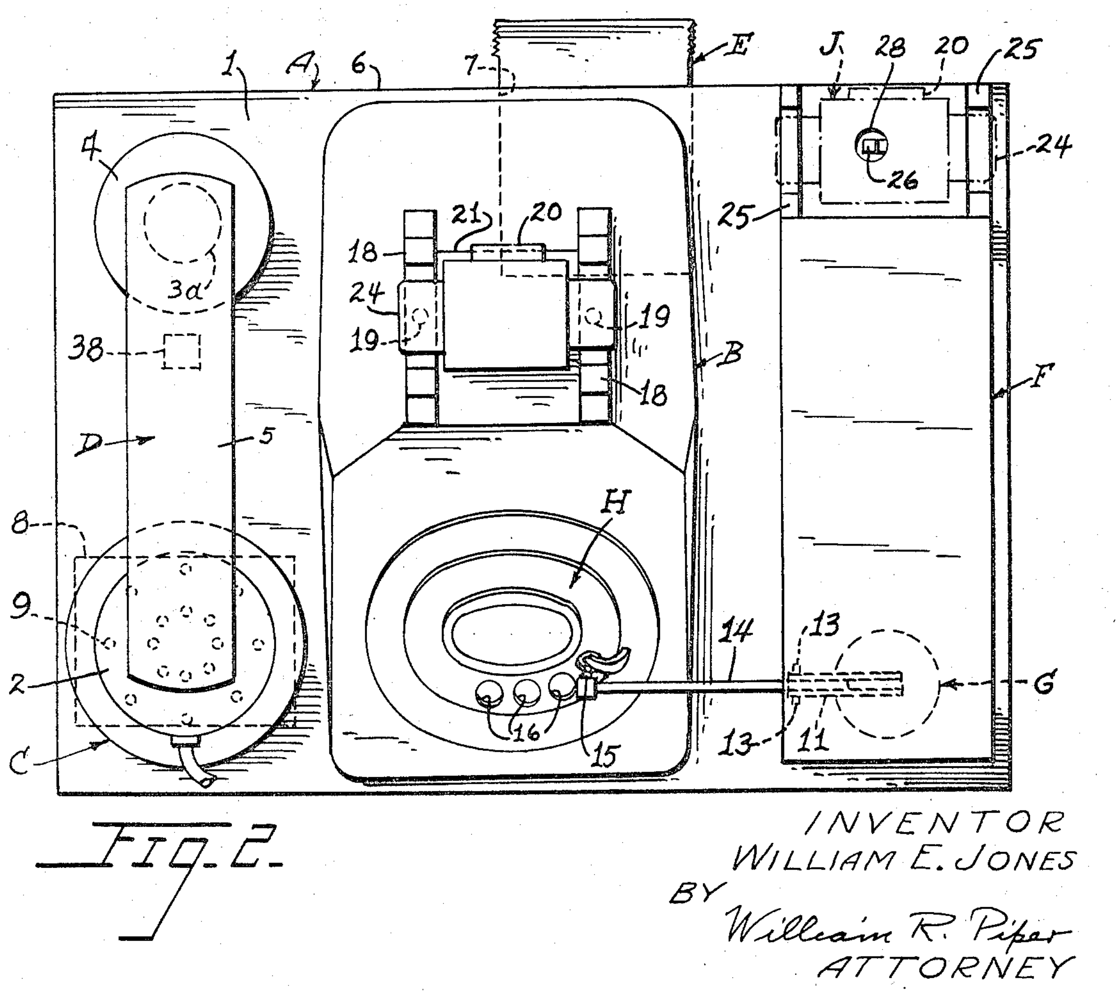
FIG. 2 is a top plan view of FIG. 1.
Figure 3:
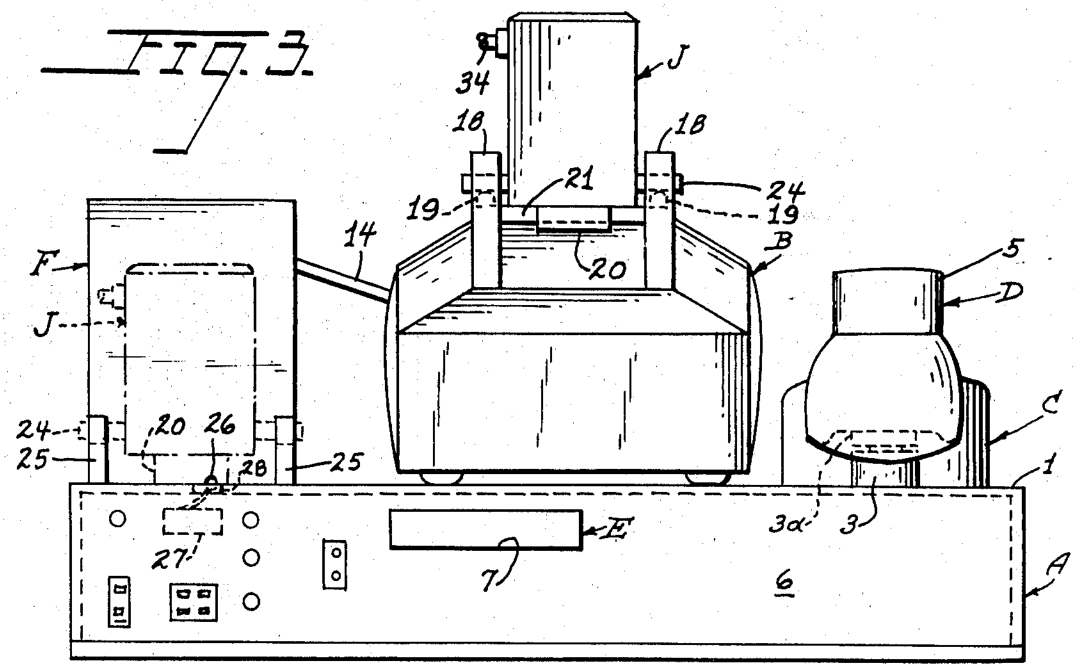
FIG. 3 is a rear elevation of FIG. 1.

In carrying out my invention I provide a base, indicated generally at A in FIGS. 1 and 2. The base contains the various electrical components of the device which will be described later. The base has a top surface 1 on which a telephone handset B, is placed. The top surface 1 also has a circular upstanding receptacle C for receiving the mouthpiece 2 of a telephone receiver D. A switch 3 also extends upwardly from the top surface 1 and it is spaced the proper distance from the receptacle C to receive the earpiece 4 of the telephone receiver D when the latter is properly placed on the top surface 1. In fact if the telephone receiver is placed on the top surface 1 in any other position than that illustrated in FIGS. 1 and 2, the receiver will roll over until the handgrip portion 5 thereof will contact the top surface or the receiver will slide off from the top surface of the device. The switch 3 has a plunger type head *3a* that is spring-biased so as to keep the switch open when the telephone receiver is not placed on the plunger. FIGS. 1, 2 and 3 show the receiver D removed from the telephone handset and placed over the top surface 1 of the device so that the earpiece 4 of the receiver will rest on the plunger *3a* and its weight will open the switch for a purpose hereinafter explained.

A tape-recording cartridge E, see FIGS. 2 and 3, is removably mounted in the base A. The rear wall 6 of the base has an opening 7 therein into which the cartridge is inserted. The cartridge is of standard construction and carries an endless tape, not shown, that has two recording tracks thereon, one for the emergency message for the telephone operator to notify the police station that a burglary is taking place and the other for the emergency message for the telephone operator to call the fire department. Later on a description of the wiring diagram will be given to explain how the proper emergency message is transmitted. The power for the tape amplifier and motor for driving the endless tape are indicated diagrammatically in FIG. 4. The loudspeaker for the tape recorder is indicated by a dotted rectangle 8 in FIG. 2. The top surface 1 of the base A, and the receptacle C for the mouthpiece 2 of the telephone receiver D, have openings 9 therein to permit the mouthpiece to receive the emergency message being broadcast by the loudspeaker. This will be explained more fully when describing the operation of the device.

The base A carries a housing F, and this is placed to the right of the telephone handset B, see FIGS. 1 and 2. The interior of the housing carries some of the electric circuits and I have indicated the telephone dial release solenoid G by dotted lines. The solenoid has a vertically movable armature 10 that is connected to a pivotally mounted sleeve 11 by an insulating link 12. The pivotal support for the sleeve 11 is shown at 13–13 in FIG. 2, and this pivotal support for the sleeve 11 is carried by the housing F by any means, not shown. A rod 14 has one end slidably mounted in the sleeve 11 and its free end carries a pin 15 that is adapted to be removably received in a desired opening 16 provided in a dial H for the telephone B.

The pin has an annular groove 15*a* in it that receives the circular edge of the opening 16 into which the pin is placed. This annular groove offers sufficient resistance to prevent the pin from accidentally slipping out of the opening 16 and permitting the cocked dial H to return to normal position. When the telephone B is set up to receive an emergency message from the tape recorder cartridge E, the dial H, is rotated to its fullest extend and then the pin 15 is inserted in the adjacent opening 16 for holding the dial in this cocked position. The spring-biased dial tends to return to normal position and this will force the pin against the finger stop 17 on the telephone to hold the dial in its cocked position until the solenoid G, is energized. The energizing of the solenoid will rock the sleeve 11 on its pivot 13 and cause the rod 14 to swing upwardly and free the pin from the dial opening 16, whereupon the dial will return to normal position and signal the telephone operator as will be explained later. The rod 14 may have radial projection, not shown, slidable in a longitudinal slot in the sleeve to prevent rotation of the rod in the sleeve.

I provide means for keeping the telephone disconnected from the telephone exchange while the telephone receiver D is removed from the telephone handset B, and is positioned on the receptacle C, and the plunger actuated switch 3. This means will automatically connect the telephone to the telephone exchange when the device is set into operation by smoke or a fire or by an occupant of the building closing a remote-control switch when he thinks a burglar or robber has entered the premises. The telephone handset has two spaced apart cradles 18 that normally receive the telephone receiver D when the telephone is not in use, and the receiver depresses a pair of spring-biased switch buttons 19 for normally keeping the telephone disconnected from the telephone exchange.

The means for keeping the telephone disconnected from the telephone exchange when the receiver D, is not mounted in the cradles 18, comprises a casing J, see FIGS. 1, 2 and 3, that is removably mounted between the cradles. The casing has a spring clip 20 that frictionally engages with a handgrip portion 21 of the telephone handset B for removably holding the casing on the telephone. A solenoid 22 is mounted in the casing J, and it has a spring-biased armature 23 that in turn carries a button-engaging arm 24 whose ends extend exteriorly of the casing and are received in the telephone cradles 18. When the solenoid is not energized the spring-biased armature 23 will press the arm 24 so that it will contact with the switch buttons 19 and keep them depressed. When the solenoid is energized in a manner hereinafter described, it will retract the armature 23 and lift the arm 24 to free the buttons 19. The telephone handset B will be connected to the telephone exchange and the dial tone can be heard in the earpiece 4 of the receiver D.

It is possible to place the casing J in another part of the base A when it is desired to use the telephone in the usual manner and position the receiver D in the cradles 18. In FIGS. 2 and 3 I show the top 1 of the base provided with a pair of cradles 25 disposed to the rear of the housing F. The cradles can receive the ends of the arm 24 and they will position the solenoid casing J between the cradles as shown by the dot-dash lines in these FIGS. The spring clip 20 for the casing will bear against the end of an arm 26 of a microswitch 27, see FIG. 3, for opening the switch and cutting off all electrical circuits in the device. FIG. 2 shows the end of the switch arm 26 as extending through an opening 28 in the top surface 1 of the base A, so as to be contacted by the solenoid casing J when the latter is placed in its storage position. The switch 27 is also shown in the wiring diagram of FIG. 4, as being placed near the 115 volt AC source and as being closed.

Figure 4:
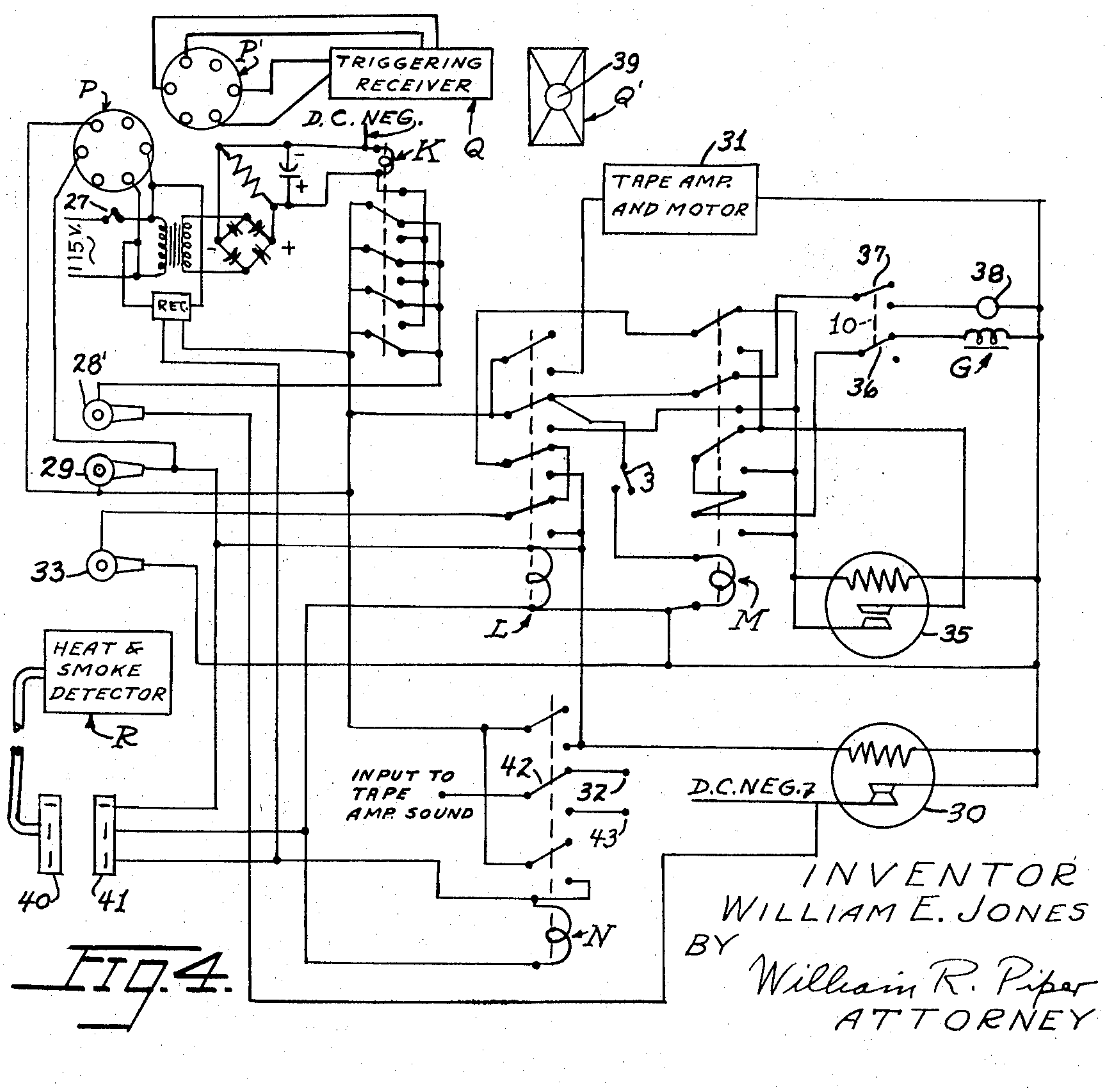
FIG. 4 is a wiring diagram illustrating the various circuits used in operating the device either automatically as when smoke or fire is the cause, or manually as when a switch is closed. The switch may be of the remote control-type, or any installation type so desired by the purchaser of this unit, such as: periphery tape, photocell etc.

I will now describe the main features of the wiring diagram of FIG. 4, and at the same time will set forth the operation of the device. The placing of the telephone receiver D on the plunger switch 3 will close the switch and it is shown open in the wiring diagram of FIG. 4. The switch 27 is closed because the dial tone release solenoid casing J is not in its dot-dash line position in FIG. 3, but instead is placed between the cradles 18 of the telephone handset B, in order to have its arm 24 keep the switch buttons 19 depressed. The 115 volt AC will have its voltage reduced to about six volts as it passes through a transformer and power supply indicated in the wiring diagram of FIG. 4. The alternating current is rectified so that approximately six volt DC flows through a relay K and energizes it. A six volt battery source, not shown, is plugged into the wiring diagram at 28', and acts as a standby source of current in case the 115 volt AC current should fail. The purpose of the relay K is to automatically switch the wiring circuits over to the six volt battery source when there is a failure in the AC current source.

A remote switch connection 29, in FIG. 4, is connected to a manually actuated switch, not shown, which when closed by an operator causes the relay L to become energized. The manually actuated switch is closed by one who thinks his house is being burglarized. Current will also flow through a normally closed 120 second time delay switch 30. This switch will open after a time period of 120 seconds and prevent further operation of the device. At the same time current will flow to the tape recorder motor and amplifier indicated schematically by the rectangle 31, and will flow to a connection 32 for a pickup head, not shown, for broadcasting the emergency message from one-half of the tape, not shown, carried by the tape recorder cartridge E. This emergency message will request police be sent to a specific address and the message will be transmitted through the loud speaker 8 and will be picked up by the mouthpiece 2 of the telephone receiver D.

Current will also flow to a connection 33, shown in the wiring diagram, to which the solenoid 22 in the casing J is connected by wiring 34, see FIGS. 1, 3 and 4. An energizing of the solenoid 22 will lift the arm 24 to free the telephone buttons 19. This will give the telephone dial tone. At the same time current will flow through a 5-second time delay switch 35 that is normally open. At the end of this 5-second time delay, the switch 35 will close and cause current to flow through the telephone dial release solenoid G, as shown in FIGS. 1, 2 and 4. The energizing of this solenoid will cause the armature 10 to pull downwardly on the pivoted sleeve 11 to rock the sleeve about its pivot 13 and swing the rod 14 to lift its pin 15 out of the dial opening 16 in which it had been received. The groove 15*a* in the pin will not be able to resist the upward swing of the rod. The spring-biased telephone dial H, will be freed and will rotate back to normal position and dial the operator at the telephone exchange. The operator in answering the call will receive the emergency message for her to telephone the police. The prerecorded message on the half of the tape that is being transmitted will give the name and address of the occupant of the building being burglarized.

When the solenoid armature 10 is pulled downwardly by the energizing of the solenoid G, it will actuate two switches shown at 36 and 37, in FIG. 4, on its downward movement. The switch 36 will be opened and cutoff any further flow of current through the solenoid G, while the switch 37 will be closed and cause a current to flow through a warning red light 38. These two switches 36 and 37 are not illustrated in FIG. 1, but they would be placed in the housing F and would be actuated in the manner mentioned on the downward movement of the armature 10. The warning light 38 is placed in an opening in the top surface 1 of the base A, and is positioned under the handgrip portion of the telephone receiver D, see the dotted square representing the light 38 in FIG. 4. The illumination of the warning light 38 will indicate that the telephone dial H, has not been set to call the telephone operator. The solenoid armature 10 will remain in its lower position even though its solenoid G is deenergized because the sleeve 11 will have been swung clockwise about its pivot 13 and the rod 14 will have slid downwardly in the downwardly inclined sleeve and will remain in this position until the rod is manually moved and its pin 15 again fitted into the proper opening 16 in the dial to hold it in its cocked position. As soon as this takes place, the armature 10 will have been lifted to again close the switch 36 an open the switch 37. The warning light 37 will be deenergized. The locking pin 15 cannot be placed in the dial H, if the receiver D, has not been replaced properly in its position in the receptacle C, and on the plunger 3*a*.

It is possible to have a wireless connection with the device so that the device can be in one part of a building and a person in another part could close a remote switch and start the device automatically to functioning and have the telephone exchange operator notify the police. Referring to the wiring diagram of FIG. 4, a receiver receptacle P, is electrically connected to the two leads that extend from the remote switch connection 29. An electric plug P′ fits into the receiving plug P, and it in turn is in electrical connection with a triggering receiver Q of standard construction. A triggering transmitter Q′, also of standard construction, can be carried by a person and it has a button 39 that can be depressed when the person thinks his home is being burglarized and he wishes to quietly inform the police of the fact. Upon pressing the button 39, the triggering transmitter Q′ will cause the triggering receiver Q to actuate the set which will operate in the manner just described.

The device will also function to transmit an emergency message automatically to the telephone exchange operator to have her notify the fire department when there is smoke or fire in the building in which the device is placed. A heat and smoke detector of standard construction is shown schematically at R, in FIG. 4. The detector R has a time-delay unit forming a part thereof so that a time delay of about 1 minute will elapse before it will cause the device to operate. This will give a person time to stop the device from operating if the fire can be quickly put out without calling the fire department. The device has an electric plug 40. The plug 40 is connected to the electric socket 41 so that when the heat and smoke detector R, is activated by fire or smoke, it will connect a relay N, in the device to the current source so that the relay will be energized. The energizing of the relay will swing a switch arm 42 from being in electrical circuit with the connection 32 into it being in electrical circuit with a connection 43. The connection 43 will cause the pickup head to play the other half of the tape which will broadcast an emergency message that the fire department should be called.

There is a time delay of a predetermined period such as 1 minute, which will transpire from the time the heat and smoke signal activates the device up to the time that the telephone dial H is released and the tape recorder starts operating to broadcast the emergency message that the telephone exchange operator notify the fire department of the fire. As already stated, this time delay forms a part of the heat and smoke detector R, and when this time-delay period has passed, the detector R will close a circuit that will energize the relay N, and cause the switch arm 42 to swing to the terminal for the connection 43. This latter connection 43 causes the pickup head of the tape recorder E to play the other half of the tape and broadcast the prerecorded emergency message for calling the fire department. As soon as the relay N becomes deenergized it will return back to normal and the switch arm 42 will again connect with the terminal for the lead 32 that will cause the first half of the tape recorder to be played to call the police during a succeeding emergency.

It is possible for a person to use the telephone in the usual manner even when it is set up for the emergency call. As soon as the person lifts the telephone receiver D, off from the spring biased plunger 3*a*, the switch 3 in FIG. 4, will close and an electric circuit will actuate the relay M, and transfer the 5-second time-delay switch 35 from the dial release solenoid G, to the dial tone release solenoid 22. The solenoid G will be energized and will actuate the armature 10 for swinging the sleeve 11 about its pivot 13, and lifting the rod 14 for freeing the pin 15 from the opening 16 in the dial H. The spring-biased dial H, will immediately return to normal position. After the 5-second time-delay period, the switch 35 will close a circuit to the solenoid 22 for energizing it and raising the arm 24 for freeing the telephone dial-tone switch buttons 22. The operator can now dial the desired telephone number in the usual manner.

After the telephone conversation is completed, the operator can place the receiver D, back in the receptacle C in a position where the earpiece 4 of the receiver will press on the plunger 3*a* to open the switch 3. The rod 14 with its pin 15 can be extended and the telephone dial H, can be rotated into a position to call the telephone exchange operator when the dial is again freed. The pin 15 is reinserted into the dial opening 16 for holding the dial in its cocked position.

I claim:

1. A telephone emergency device for use with a handset, cradletype telephone having a cradle, telephone switch buttons, and a spring-biased dial with openings therein:

a. a tape recorder having an endless tape with two parallel emergency messages thereon, said tape recorder being connectable to a loud speaker;
b. means for supporting the telephone receiver so that its mouthpiece will register with said loudspeaker and pick up the emergency message when the tape recorder is operated;
c. electrically controlled releasable means receivable in the telephone cradle for normally holding the telephone switch buttons in open position;
d. a first solenoid for actuating said electric means for freeing said telephone switch buttons for connecting the telephone with the telephone operator;
e. means for holding the spring-biased telephone dial in a predetermined cocked position so that when the dial is freed it will automatically connect the telephone with the telephone operator;
f. a second solenoid for freeing said means that holds the telephone dial in a cocked position and permitting the dial to return to normal in order to connect with the telephone operator;
g. an electrical configuration including a switch which when manually closed will connect said first solenoid to a current source for energizing the solenoid and freeing the telephone switch buttons, said switch also connecting said second solenoid to a current source for energizing it and causing the telephone dial-engaging means to free the cocked dial and permit it to return to normal position, said switch also closing an electric circuit to said tape recorder for causing it to send out one of the prerecorded emergency messages;
h. a heat and smoke detector including a second switch which will be automatically closed by said detector and will connect said first and second solenoids to the current source and will close another circuit to said tape recorder for causing it to send out the other prerecorded emergency message for calling the fire department;
i. an automatic predetermined time delay switch circuit interposed between the closing of said first solenoid and said second solenoid so that said first solenoid will free the telephone switch buttons a predetermined time period before said second solenoid will free the cocked telephone dial; and
j. a second automatic predetermined time delay switch forming a part of the electrical configuration for cutting off the source of current to the configuration after said tape recorder has operated for a preset time interval.

2. The combination as set forth in claim 1: and in which said telephone emergency device has a self-closing electric switch which is opened by the telephone receiver when placed in a predetermined position on the device, said switch being in electrical connection with said second solenoid for energizing it and causing said dial-holding means to free the dial until the receiver is placed in the predetermined position and contacts with said self-closing switch to open it.

3. The combination as set forth in claim 2: and in which a warning light is in the electric circuit formed between said self-closing switch and said second solenoid, said light being illuminated until the telephone receiver is placed in the predetermined position and contacts the self-closing switch to open it.

4. A telephone emergency device for use with a handset, cradle-type telephone having a cradle, telephone switch buttons, and a spring-biased dial with openings therein;

a. a tape recorder having an endless tape with two parallel emergency messages thereon, said tape recorder being connectable to a loud speaker;

b. means for supporting the telephone receiver so that its mouthpiece will register with said loudspeaker and pick up the emergency message when the tape recorder is operated;

c. electrically controlled releasable means receivable in the telephone cradle for normally holding the telephone switch buttons in open position;

d. a first solenoid for actuating said electric means for freeing said telephone switch buttons for connecting the telephone with the telephone operator;

e. means for holding the spring-biased telephone dial in a predetermined cocked position so that when the dial is freed it will automatically connect the telephone with the telephone operator;

f. a second solenoid for freeing said means that holds the telephone dial in a cocked position and permitting the dial to return to normal in order to connect with the telephone operator;

g. an electrical configuration including a switch which when manually closed will connect said first solenoid to a current source for energizing the solenoid and freeing the telephone switch buttons, said switch also connecting said second solenoid to a current source for energizing it and causing the telephone dial-engaging means to free the cocked dial and permit it to return to normal position, said switch also closing an electric circuit to said tape recorder for causing it to send out one of the prerecorded emergency messages; and h. a heat and smoke detector including a second switch which will be automatically closed by said detector and will connect said first and second solenoids to the current source and will close another circuit to said tape recorder for causing it to send out the other prerecorded emergency message for calling the fire department;

i. an automatic predetermined time-delay switch circuit interposed between the closing of said first solenoid and said second solenoid so that said first solenoid will free the telephone switch buttons a predetermined time period before said second solenoid will free the cocked telephone dial;

j. said telephone emergency device having a self-closing electric switch that is opened by the telephone receiver when the latter is placed in a predetermined position on the device, said switch being in electrical connection with said second solenoid for energizing it and causing said dial-holding means to free the dial until the receiver is placed in the predetermined position and contacts with said self-closing switch to open it; and k. said electrical configuration including a relay that is energized when connected to the current source by the removal of the telephone receiver from its predetermined position and the automatic closing of the self-closing switch, the energized relay closing a circuit that transfers the first time delay switch so that said second solenoid will free the cocked telephone dial a predetermined time period before said first solenoid will free the telephone switch buttons so that the dial tone can be heard through the receiver.